| United States Patent [19] | [11] Patent Number: 4,997,893 |
| --- | --- |
| Süling et al. | [45] Date of Patent: Mar. 5, 1991 |

[54] GRAFT COPOLYMERS, A PROCESS FOR THEIR PREPARATION AND THEIR USE

[75] Inventors: Carlhans Süling, Odenthal; Friedrich Reich, Leverkusen; Wilfried Kortmann, Hagen; Klaus-Dieter Schultz, Monheim; Manfred Fischer, Leverkusen, all of Fed. Rep. of Germany

[73] Assignee: Bayer Aktiengesellschaft, Leverkusen, Fed. Rep. of Germany

[21] Appl. No.: 293,246

[22] Filed: Jan. 4, 1989

[30] Foreign Application Priority Data

Jan. 14, 1988 [DE] Fed. Rep. of Germany ....... 3800845

[51] Int. Cl.$^5$ ................................................ C08G 8/30
[52] U.S. Cl. ................ 525/517.5; 525/518; 525/923; 524/598
[58] Field of Search ............... 525/518, 517.5, 923; 524/598

[56] References Cited

U.S. PATENT DOCUMENTS 3,341,497  9/1967  Sherman et al. ............... 525/518 X
3,510,455  5/1970  Olson ............................. 528/248 X

*Primary Examiner*—Lewis T. Jacobs
*Assistant Examiner*—R. Dean, Jr.
*Attorney, Agent, or Firm*—Sprung Horn Kramer & Woods

[57] ABSTRACT

The present invention relates to graft copolymers based on at least one ethylenically unsaturated monomer containing perfluoroalkyl groups mixed with an acrylic, methacrylic, vinyl, maleic and/or styrene derivative and a melamine polycondensate as the graft substrate, which are suitable for oleophobic treatment of textiles, carpets, paper or leather and at the same time are effective hydrophobicity agents, and a process for their preparation.

14 Claims, No Drawings

GRAFT COPOLYMERS, A PROCESS FOR THEIR PREPARATION AND THEIR USE

The present invention relates to graft copolymers based on at least one ethylenically unsaturated monomer containing perfluoroalkyl groups mixed with an acrylic, methacrylic, vinyl, maleic and/or styrenic derivative and a melamine polycondensate as the graft substrate, which are suitable for oleophobic treatment of textiles, carpets, paper or leather and at the same time are effective hydrophobicity agents, and a process for their preparation.

Graft copolymers based on perfluoroalkyl monomers and ethylenically unsaturated monomers using various graft bases are known.

Dispersions or solutions, for example based on polyvinyl compounds or based on polyurethanes, are used as the graft base. Such dispersions usually contain macromolecular compounds with very high molecular weights (MW > 50,000) as the disperse phase, since the grafting yields, as is generally known, are good if high molecular weight graft bases are used.

However, disadvantages of such high molecular weight graft substrates in the preparation of graft copolymers which are used for oleophobic treatment of textiles or carpets are that such high molecular weight graft bases and the resulting graft copolymers are incompatible and a high-quality treatment therefore becomes difficult.

The use of non-grafted polycondensates containing perfluoroalkyl groups for oleophobic treatment of textiles is described in U.S. Pat. No. 3,510,455. These are prepolymers which are based on aldehydes, compounds containing amino groups and compounds containing perfluoroalkyl groups and which contain a reactive H atom. However, textile treatment using these prepolymers gives textiles "with a hard handle" and therefore does not meet the modern requirements of oleophobic treatments.

The object was therefore to provide graft copolymers which, with the smallest possible number of perfluoroalkyl groups per area to be treated, exhibit a good oleophobicity and hydrophobicity without the important properties of goods, such as, for example, "the handle" or the stability to light, being adversely influenced, since when used for hydrophobic treatment, corresponding concentrations of polymers which have a high content of perfluoroalkyl groups impair the handle of the resulting articles and reduce the abrasion resistance.

Surprisingly, it has been found that graft copolymers with very good hydrophobic/oleophobic properties can be obtained using the polycondensates according to the invention as graft bases, although these graft bases have relatively low molecular weights.

The invention relates to graft copolymers based on at least one ethylenically unsaturated monomer containing perfluoroalkyl groups mixed with acrylic, methacrylic, vinyl, maleic and/or styrenic derivatives, which are characterized in that melamine polycondensates are used as the graft substrate.

Preferred ethylenically unsaturated monomers containing perfluoroalkyl groups correspond to the general formula I and/or II

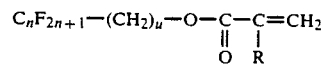

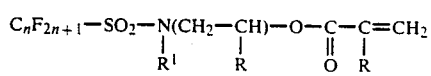

wherein
n stands for an integer between 4 and 20,
u stands for 1 or 2,
R stands for H or $CH_3$ and
$R^1$ stands for an alkyl radical with 1 to 7 C atoms, which can be straight-chain, branched or cyclic and optionally substituted with alkoxy groups.

The invention furthermore relates to a process for the preparation of graft copolymers based on at least one ethylenically unsaturated monomer containing perfluoroalkyl groups mixed with acrylic, methacrylic, vinyl, maleic and/or styrene derivatives, which is characterized in that melamine polycondensates are used as the graft substrate.

In a preferred embodiment, auxiliary solvents are used in the process for the preparation of the graft copolymers.

The graft copolymers are used in the oleophobic/hydrophobic treatment of textiles, carpets, paper and leather.

The ethylenically unsaturated monomers used as comonomers in the grafting are, for example, acrylic acid, acrylamides and acrylic acid esters. From the series of acrylic derivatives, acrylic acid esters, such as, for example, ethyl acrylate, stearyl acrylate and behenyl acrylate, are preferably used.

Methacrylic acid, methacrylamides and methacrylic acid esters are furthermore suitable as comonomers. From the series of methacrylic acid derivatives, the methacrylic acid esters, such as ethyl methacrylate, butyl methacrylate, cyclohexyl methacrylate or stearyl methacrylate, are preferably used.

Styrene, 2-methylstyrene, vinyl chloride or vinyl acetate are also suitable as comonomers, as are maleic acid, maleimides or maleic acid esters and maleic acid half-esters.

Water-insoluble comonomers are in general preferred, although contents of up to 10%, preferably 2%, of water-soluble comonomers can be used, for example, in order to ensure a certain adhesion to the various substrates in the oleophobic/hydrophobic treatment.

To improve the grafting yield, it may be beneficial to use small amounts of allyl compounds, such as triallyl cyanurate, diallyl ether or allyl butyl ether, as comonomers. A very good effect is achieved if, for example, a mixture of 30 to 60% by weight of perfluoroalkyl acrylate and/or perfluoroalkyl methacrylate and 40 to 70% by weight of monomers which are free from perfluoroalkyl groups is used as the monomer mixture; it is advantageous here to use a mixture which in its turn again is a mixture of acrylic and/or methacrylic acid esters as the monomer which is free from perfluoroalkyl groups. Particularly good results are obtained if, in addition to monomers, such as butyl acrylate or ethyl methacrylate, methacrylic acid or acrylic acid esters of long-chain alcohols, such as stearyl alcohol or behenyl alcohol, are used as components of significant quantity.

The polymerization is triggered off by agents which form free radicals; suitable agents which form free radicals are, for example, aliphatic azo compounds, such as azodiisobutyronitrile and inorganic or organic peroxides. Peroxides which may be mentioned are diacyl peroxide, such as, for example, dibenzoyl peroxide, and hydroperoxides, such as, for example, tert.-butyl hydroperoxide. tert.-Butyl perpivalate and percarbonates, such as dicyclohexyl percarbonate, are also suitable. Particularly suitable inorganic peroxides are the alkali metal salts of peroxydisulphonic acid. It is of course possible to carry out the graft copolymerization at temperatures of 40° C. or below by using redox systems. Suitable starter systems are, for example, mixtures of peroxydisulphonates and reduced sulphur compounds, such as bisulphites or thiosulphates, or combinations of diacyl peroxides with tert.- amines. The known chain transfer agents based on mercapto compounds or aliphatic aldehydes can be used to adjust the molecular weights or the molecular weight distributions.

The perfluoroalkyl monomers used are solid, usually crystalline compounds. It is therefore often necessary to use auxiliary solvents for the graft polymerization or graft copolymerization if a large excess quantity of comonomers is not used. Suitable auxiliary solvents are solvents which are largely inert towards peroxides. Examples which may be mentioned are methanol, tert.-butanol, acetone, methyl ethyl ketone, toluene, ethyl acetate, methyl tert.-butyl ether and mixtures of such solvents.

The graft copolymerization can be carried out in bulk, in solution or by the procedure of polymerization in emulsion. A preferred embodiment is free radical grafting in aqueous emulsion. The customary anionic, cationic or non-ionic emulsifiers can be used to stabilize the dispersions according to the invention and also to prepare the monomer emulsions used in the process according to the invention. Examples of anionic emulsifiers are alkylsulphonates, alkylarylsulphonates, fatty alcohol sulphates and sulfosuccinic acid esters, and furthermore emulsifiers containing perfluoroalkyl groups, such as ammonium or tetraethylammonium salts of perfluorooctanesulphonic acid or the potassium salt of N-ethyl-N-perfluorooctanesulphonylglycine. Examples of cationic emulsifiers are quaternary ammonium or pyridinium salts, for example stearyldimethylbenzylammonium chloride or N,N,N-trimethyl-N-perfluorooctanesulphonamidopropyl-ammonium chloride. Examples of non-ionic emulsifiers are polyglycol ethers, for example ethylene oxide/propylene oxide block polymers or copolymers, alkoxylation products, in particular ethoxylation products of fatty alcohols, alkylphenols, fatty acids, fatty acid amides, sorbitan monooleate or N-alkyl-N-perfluorooctanesulphonylglycines. Combinations of non-ionic emulsifiers with anionic or cationic emulsifiers are particularly suitable.

The process according to the invention is in general carried out at temperatures between 20° and 120° C., preferably between 50° and 100° C.

After working up, that is to say after removal of auxiliary solvents and residual monomers, the resulting dispersions have a solids content of between 10 and 30% by weight.

The graft bases according to the invention are melamine condensation products. Such condensation products can be obtained, for example, by subjecting methylol products of aminotriazines or etherification and esterification products thereof to polycondensation with, for example, aliphatic carboxylic acids and with secondary or primary amines. The process can be carried out, for example, in a manner in which the carboxylic acid is first reacted with the melamine derivative in order to subseqently react the amino component.

A detailed description of such condensation products is given in German Patent Specification 956,990.

Chemical variation of the graft base is possible within very wide limits. Particularly good results are achieved if paraffins are used as additional auxiliaries during the grafting. Such auxiliary solvents have the effect that the resulting finely divided dispersions remain stable to shearing forces.

EXAMPLE

Preparation of the graft base: polycondensate A 1.5 mol of behenic acid are melted and 1 mol of melamine-hexamethylol pentamethyl ether and 0.9 mol of N-methyl-diethanolamine are simultaneously added in the course of 30 minutes. During this addition, the melt is heated to 130° C. and is kept at this temperature for 3 hours. The same amount by weight of a paraffin of melting point 52° C. is then introduced into the melt.

Preparation of the graft copolymer

In a reaction vessel, 28.8 parts by weight of an ethoxylated nonyl-phenol with on average 10 ethoxy units and a clear point of 55° C. and 4.7 parts by weight of benzyl-dodecyl-dimethylammonium chloride are dissolved in 4,800 parts by weight of desalinated water. An aqueous solution of 382 parts by weight of N-ethoxymethacryloyl-N-methyl-perfluorooctylsulphonamide, 187 parts by weight of stearoyl methacrylate, 151 parts by weight of vinyl acetate and 10.8 parts by weight of dilauroyl peroxide are mixed with 2,160 parts by weight of ethyl acetate. 72 parts by weight of polycondensate A are additionally added.

The mixture is then emulsified in an emulsifying machine at 50° C. The particle size of the resulting aqueous emulsion is 480 nm. A solution of 7.2 parts by weight of tert.-butyl perpivalate in 10 parts by weight of ethyl acetate is introduced into the stirred emulsion. The emulsion is brought to the boiling point under reflux and kept at the boiling point for 2 hours. The ethyl acetate is then distilled off. A temperature of 80° C. is thereby established in the reaction vessel. Residual monomers and solvents still present are then removed in vacuo.

An aqueous polymer dispersion with a solids content of 12.8% by weight is obtained. The particle size is 520 nm. The fluorine content of the solid is 23.9% by weight.

During technological testing, a fabric based on acrylic fibres (300 g/m$^2$) treated with this graft product shows an oil value of 5 according to AATCC 0118. 0.1 g of fluorine are found per 240 g of fabric.

We claim:

1. In a graft copolymer comprising a melamine polycondensate as a graft substrate, wherein the improvement comprises the copolymer including mixture of at least one at least ethylenically unsaturated monomer containing perfluoroalkyl groups and one or more of acrylic, methacrylic, vinyl, maleic or styrenic derivatives.

2. A graft copolymer according to claim 1, wherein the ethylenically unsaturated monomer containing perfluoroalkyl groups is of the formula I or II

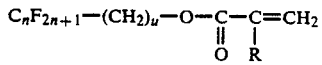

$$\text{I}$$

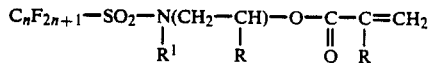

$$\text{II}$$

or combinations of formulas I and II,
wherein
n stands for an integer between 4 and 20,
u stands for 1 or 2,
R stands for H or $CH_3$
$R^1$ stands for an alkyl radical with 1 to 7 C atoms, which is straight-chain, branched or cyclic, said alkyl radical being unsubstituted or substituted with alkoxy radicals.

3. A graft copolymer according to claim 1, wherein the acrylic derivative comprises acrylic acid, acrylamides or acrylic acid esters, wherein the methacrylic derivative comprises methacrylic acid, methacrylamides or methacrylic acid esters, wherein the styrenic derivative comprises styrene or 2-methylstyrene, wherein the vinyl derivative comprises vinyl chloride or vinyl acetate, and wherein the maleic derivative comprises maleic acid, maleimides, maleic acid esters or maleic acid half-esters.

4. A graft copolymer according to claim 3, wherein the acrylic acid ester is selected from the group consisting of ethyl acrylate, stearyl acrylate and behenyl acrylate.

5. A graft copolymer according to claim 3, wherein the methacrylic acid ester is selected from the group consisting of ethyl methacrylate, butyl methacrylate, cyclohexyl methacrylate, and stearyl methacrylate.

6. A graft copolymer according to claim 1, wherein the styrenic derivative is styrene or 2-methylstyrene.

7. A process for the preparation of a graft copolymer comprising graft polymerizing at least one ethylenically unsaturated monomer containing perfluoroalkyl groups and one or more of acrylic, methacrylic, vinyl, maleic or styrenic derivatives onto a graft substrate comprising a melamine polycondensate.

8. A process according to claim 7, which further comprises conducting the process in the presence of a solvent which is largely inert towards peroxide.

9. A process according to claim 8, wherein the solvent is selected from the group consisting of methanol, tert. butanol, acetone, methyl ethyl ketone, toluene ethyl acetate, methyl tert. butyl ether and mixtures thereof.

10. A process according to claim 7, wherein the process is conducted at a temperature of 20° to 120° C.

11. A process according to claim 10, wherein the temperature is 50° to 100° C.

12. A process according to claim 7, wherein the process is conducted in the presence of a paraffin which has the effect that the resulting finely divided dispersions remain stable to shearing forces.

13. A process according to claim 7, wherein the graft polymerizing is carried out in bulk, in solution or in emulsion.

14. A process according to claim 7, wherein the graft polymerizing is conducted by free radical grafting in an aqueous emulsion.

* * * * *